(12) United States Patent
Vaganov et al.

(10) Patent No.: US 6,628,882 B2
(45) Date of Patent: Sep. 30, 2003

(54) VOA DEVICE AND ATTENUATION METHOD WITH IMPROVED LINEARITY

(75) Inventors: Vladimir I. Vaganov, Los Gatos, CA (US); Sebastiaan R. In't Hout, San Jose, CA (US)

(73) Assignee: MegaSense, Inc., Sunnyvale, CA (US)

( * ) Notice: Subject to any disclaimer, the term of this patent is extended or adjusted under 35 U.S.C. 154(b) by 231 days.

(21) Appl. No.: 09/951,859

(22) Filed: Sep. 13, 2001

(65) Prior Publication Data

US 2003/0049009 A1 Mar. 13, 2003

(51) Int. Cl.[7] .................................................. G02B 6/00
(52) U.S. Cl. ......................................................... 385/140
(58) Field of Search ............................................ 385/140

(56) References Cited

U.S. PATENT DOCUMENTS

| | | | | | |
|---|---|---|---|---|---|
| 5,727,099 | A | * | 3/1998 | Harman ........................ | 385/52 |
| 6,085,016 | A | * | 7/2000 | Espindola et al. ........... | 385/140 |
| 6,163,643 | A | * | 12/2000 | Bergmann et al. ........... | 385/140 |
| 6,240,237 | B1 | * | 5/2001 | Lelu ............................. | 385/140 |
| 6,301,425 | B1 | * | 10/2001 | Espindola et al. ........... | 385/140 |
| 6,304,709 | B1 | * | 10/2001 | Fujita .......................... | 385/140 |
| 6,363,203 | B1 | * | 3/2002 | Dautartas ..................... | 385/140 |
| 6,381,382 | B2 | * | 4/2002 | Goodman et al. ............ | 385/22 |
| 6,459,845 | B1 | * | 10/2002 | Lee et al. ..................... | 385/140 |
| 6,553,175 | B2 | * | 4/2003 | Jaspan ......................... | 385/140 |
| 6,580,868 | B2 | * | 6/2003 | Chen et al. .................. | 385/140 |
| 2002/0071627 | A1 | * | 6/2002 | Smith et al. .................. | 385/15 |

* cited by examiner

*Primary Examiner*—Akm Enayet Ullah
*Assistant Examiner*—Michelle R. Connelly-Cushwa
(74) *Attorney, Agent, or Firm*—Patrick Reilly

(57) ABSTRACT

A variable optical attenuator, or VOA, for attenuating an optical signal between two photonic components by changing an alignment of a light beam with an output photonic component in at least two dimensions. A first configuration of the invented VOA has an actuator and two optical fibers. The actuator moves one optical fiber to form a light beam trajectory on the remaining optical fiber, wherein the shape of the trajectory has at least two separate dimensional components. A second configuration of the invented VOA includes a mirror that the actuator moves within at least two degrees of freedom and thereby forms a two-dimensional trajectory of the reflected light beam on a photonic component. A third embodiment includes a mirror, a mirror actuator and a dual fiber collimator having a lens and two optical fibers. The VOA may be partially or wholly integrated on a substrate and/or incorporated as a MEMS-based device.

68 Claims, 9 Drawing Sheets

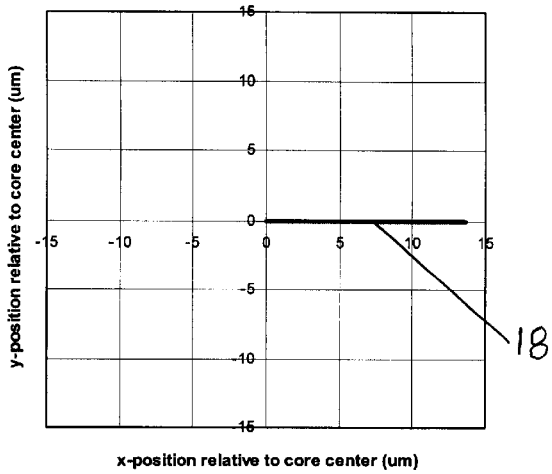
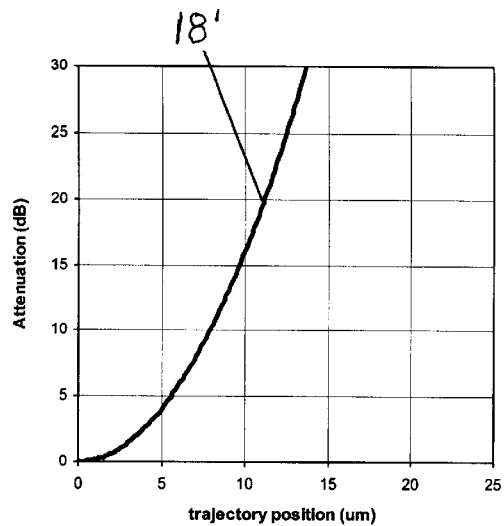
FIG. 6A  FIG. 6B
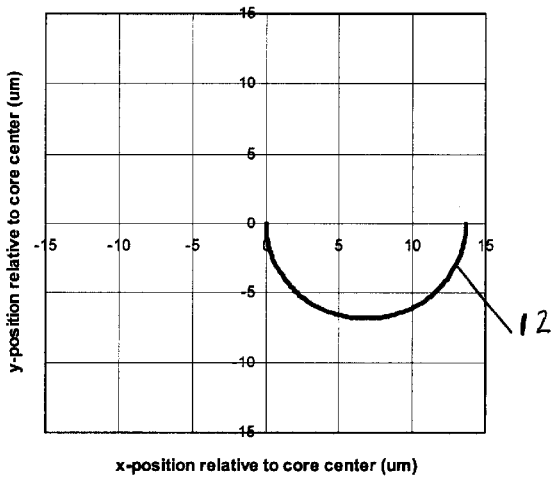
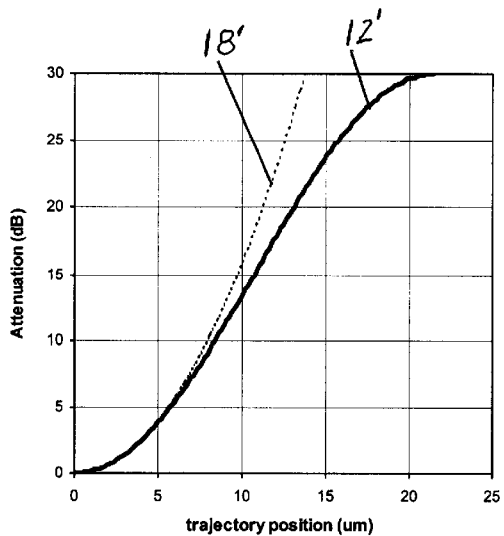
FIG. 7A  FIG. 7B

VOA DEVICE AND ATTENUATION METHOD WITH IMPROVED LINEARITY

FIELD OF THE INVENTION

The present invention relates to methods and devices for attenuating an optical signal. The present invention more particularly relates to methods and devices for variably attenuating an optical signal within an optical network or a micro-electro-mechanical system (MEMS).

BACKGROUND OF THE INVENTION

In the modern optical network there are many places where there are requirements to attenuate the optical power of a signal. The prior art includes methods and devices that enable transmission and attenuation of a light beam from an input wave guide and to an output wave guide by aiming and mis-aiming the light beam in a direct transmission from the input wave guide and into the output wave guide. The prior art additionally includes devices that employ a mirror to reflect the light beam from an input wave guide, such as an optical fiber, and into an output wave guide, where the output wave guide may also be an optical fiber. These prior art techniques, however, exhibit highly non-linear relationships between an actuator control signal and a resulting attenuation, as measured in decibels, of a transmission of the light beam, wherein the sensitivity of the effected attenuation is often undesirably high in response to small variations in the control signal.

A long felt need therefore exists to provide a method and device for variably attenuating an optical signal in a more linear relationship between the actuator control signal and the resulting optical signal attenuation, where the attenuation is measured in decibels. Additionally, a MEMS based variable optical attenuator that provides a finer and more precise control over the optical attenuation of the optical signal would satisfy certain needs of optical systems architects and improve the performance of an optical communications network.

OBJECTS OF THE INVENTION

It is an object of the present invention to provide a method of variable optical attenuation with improved performance.

It is an object of certain preferred embodiments of the present invention to provide a variable optical attenuator, or VOA, having improved characteristics.

It is an alternate object of certain preferred embodiments of the present invention to provide a VOA that attenuates an optical signal with improved linearity.

It is a still alternate object of certain preferred embodiments of the present invention to provide a VOA that attenuates an optical signal with improved resolution.

It is another object of certain preferred embodiments of the present invention to provide a VOA that attenuates an optical signal with improved accuracy.

It is yet another object of certain preferred embodiments of the present invention to provide a VOA that attenuates an optical signal with decreased power requirements.

SUMMARY OF THE INVENTION

The invention is a variable optical attenuator and method of use thereof for attenuating an optical signal by directing the transmission of a light beam into a photonic component along a trajectory, where the trajectory lies on a receiving face of the photonic component and has geometric components in at least two dimensions. The method of the preferred embodiment of the present invention comprises the generation of a non-linear trajectory of a light beam on an output photonic component by directing the light beam in two dimensions between an input photonic component and the output photonic component. The non-linear trajectory is formed by changing the direction of the light beam and thereby changing an alignment of the light beam with regard to the receiving face of the output photonic component.

The method of the present invention linearizes the optical-loss-versus-actuation curve for the invented VOA, in which attenuation of an optical signal is based on a misalignment of the light beam from, for example, as transmitted from the receiving face 14 of the first optical fiber to the receiving face of the second optical fiber.

Prior art VOA's based on this misalignment method generate variable optical losses by moving a spot of the light beam along the trajectory therefore upon the receiving face of the photonic component. The spot is the intersection, or strike, of the light beam on the receiving face. The spot includes a center point (peak power density point) of the light beam. In the prior art attenuation is achieved by locating strike and the center point away from a center of the core of an output optical fiber along a linear trajectory, i.e. within a straight line. The disadvantage of the prior art is that the loss versus position of the image is a highly non-linear (approximately quadratic) relationship due to the wave guide properties of single mode fibers. This means that at higher attenuation settings, the actual attenuation is highly sensitive to the spot position which puts severe constraints on the control of the spot position.

The method of the present invention comprises the steps of moving the light beam to locate the spot on the face of the receiving fiber along a two-dimensional trajectory, instead of along a straight line. The two-dimensional trajectory can be designed such that the overall loss-versus-trajectory-position is linearized significantly compared to the quadratic relation when moving along a straight line, reducing the sensitivity to position uncertainty.

A trajectory path of the light beam is established on a receiving face of the photonic component by dynamically altering the direction of the light beam in at least two dimensions. A trajectory path is created in certain preferred embodiments of the method of the present invention wherein the relationship between the distance traveled by the light beam within the trajectory and the resulting attenuation, as expressed in decibels, is more linear as compared with the prior art.

A trajectory path of the light beam can alternately or additionally be chosen as to improve the linearity between a control signal and a resulting attenuation, as expressed in decibels, as the control signal is varied. The method of the present invention is not limited to actuators that act on a photonic component in linear or near relationships between the control signal and a variable force, load or other output of the attenuator directed to a photonic component, such as an optical fiber or a mirror.

A photonic component as defined herein includes mirrors, prisms, wave guides, optical fibers, lenses, collimators, and other suitable photonic and optical devices and elements known in the art. A wave guide as defined herein includes optical fibers, planar wave guides, and other suitable channels for optical signal and light energy transmission known in the art.

A first preferred embodiment of the present invention includes an input wave guide, an output wave guide and an actuator. The actuator is operatively coupled, in alternate preferred embodiments, to either the input wave guide or the output wave guide, or both. The light beam travels from the input wave guide and towards the output wave guide. The actuator moves one or more wave guides to which it is operatively coupled within at least two degrees of freedom, or in two dimensions, to form a trajectory of the light beam having geometric components of at least two dimensions. The at least two-dimensional trajectory enables the attenuation, as expressed in decibels, of the transmission of the light beam with an increased linearity, over the prior art, in relation to a control or driving signal supplied to the actuator. The control signal is, or comprises, in various preferred embodiments of the present invention, an electrical current, a voltage, power, or other suitable control signal parameters, qualities or content known in the art. Certain alternate preferred embodiments include optical fibers as input and/or output wave guides.

A second preferred embodiment of the present invention includes an input wave guide, an output wave guide, a mirror, a mirror actuator and an output collimator. The output collimator may be or comprise an optical lens, a spherical lens, an aspherical lens, a ball lens, a GRIN lens, a C-lens, a lens system, or another suitable collimating element known in the art. The output collimator is positioned between the mirror and the output wave guide. The light beam travels from the input wave guide to the mirror and is reflected from the mirror and focused through the output collimator and into the output wave guide. The mirror may be a substantially flat mirror or another suitable mirror known in the art. The position of the mirror determines the variable optical attenuation of the light beam transmission from the input wave guide to the output wave guide. The mirror actuator is operatively coupled to the mirror. The mirror actuator moves the mirror within at least two degrees of freedom, or in two dimensions, to form a trajectory of the light beam wherein the trajectory has geometric components of at least two dimensions. The at least two-dimensional trajectory enables the attenuation of the light beam transmission with an increased linearity, over the prior art, in relation to a driving signal supplied to the actuator. The second preferred embodiment may include optical fibers as wave guides. The second preferred embodiment may optionally include an input collimator. The input collimator is positioned between the input wave guide and the mirror. The light beam travels from the input wave guide to the mirror via the input collimator, and is reflected from the mirror and toward the output wave guide via the output collimator.

A third preferred embodiment of the present invention includes a mirror, a mirror actuator, and a dual optical fiber collimator having a lens and an input optical fiber and an output optical fiber. The dual fiber collimator lens may be or comprise one or more collimating elements or focusing elements, such as an optical lens, a spherical lens, an aspherical lens, a ball lens, a GRIN lens, a C-lens, a lens system, or another suitable collimating element known in the art. The dual fiber collimator lens is positioned relative to the mirror and the input and output optical fibers to collimate the light beam as the light beam travels toward the mirror and to focus the light beam as the light beam travels from the mirror. The light beam travels from the input optical fiber to the mirror via the input collimator component, and is reflected from the mirror and toward the output optical fiber via the output collimator component. The mirror actuator moves the mirror within at least two degrees of freedom, or in two dimensions, to form a trajectory of the light beam wherein the trajectory has geometric components of at least two dimensions. The at least two-dimensional trajectory enables the attenuation of the light beam transmission with an increased linearity, over the prior art, in relation to a driving signal supplied to the actuator.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 6A illustrates the prior art linear trajectory of FIG. 2A.

FIG. 6B graphs the optical loss versus the light beam spot position of the prior art trajectory of FIG. 2A.

FIG. 7A illustrates the circular trajectory of FIGS. 1A and 2B.

FIG. 7B graphs the optical loss versus the light beam spot position of the prior art trajectory of FIG. 2A.

DETAILED DESCRIPTION OF THE PREFERRED EMBODIMENT

While the description above provides a full and complete disclosure of the preferred embodiments of the present invention, various modifications, alternate constructions, and equivalents will be obvious to those with skill in the art. Thus the scope of the present invention is limited solely by the appended claims.

Figure 1:
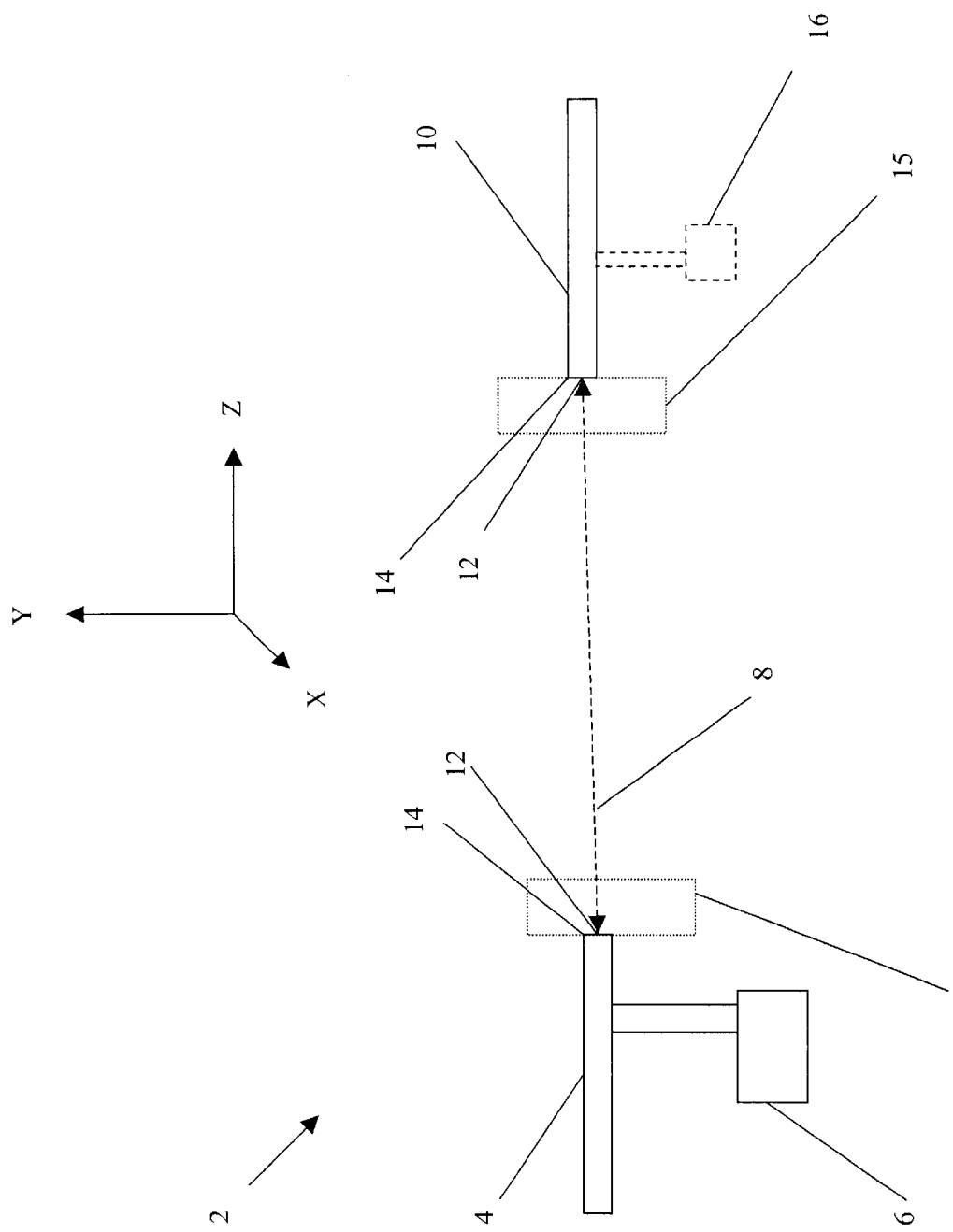
FIG. 1 is a schematic of a first preferred embodiment of the present invention that generates a prior art linear-radial trajectory, a circular trajectory and a spiral trajectory of FIGS. 7A and 8, as well as ellipse trajectory, an oval trajectory and other suitable non-linear trajectories known in the art, by moving one of two optical fibers while transmitting the light beam from one optical fiber to another optical fiber.

Referring now generally to the Figures and particularly to FIG. 1, a preferred embodiment of the present invention, or invented VOA 2, includes a first optical fiber 4 operatively coupled with an actuator 6. The actuator 6 moves the first optical fiber 4 while a light beam 8 travels either (1) from the first optical fiber 4 to a second optical fiber 10, or (2) from the second optical fiber 10 to the first optical fiber 4. The actuator 6 moves the first optical fiber within two linear degrees of freedom, or in two dimensions, namely via linear motion along an X axis and via linear motion along a Y axis. The X axis and the Y axis are substantially mutually orthogonal to each other and to a Z vector, where the Z vector is the direction of travel of the light beam 8 after the light beam 8 has exited an optical fiber 4, 10. The two dimensional movement range of the actuator 6 thus enables the invented VOA 2 to cause the light beam 8 to enter an optical fiber 4, 10 at points within a two dimensional, circular trajectory 12, as further discussed below. The change of direction of the light beam 8 causes a change of alignment of the light beam 8 with respect to the receiving optical fiber 4, 10. The circular trajectory 12 is formed on a receiving face 14 of the optical fiber 4, 10 that is receiving the light beam 8 after the light beam has exited the other optical fiber 4, 10. The first optical fiber 4 and the second optical fiber 10 may either or both have optional collimators 15. The optional collimator 15 collimates the light beam 8 as the light beam 8 enters the optical fiber 4, 10 and focuses the light beam 8 after the light beam 8 exits the optical fiber 4, 10. The invented VOA 2 may further comprise a secondary actuator 16 that is operatively coupled with the second optical fiber 10 and moves the second optical fiber 10 in order to facilitate the formation of the trajectory 12 and a direction of the light beam 8 at a particular point of the trajectory 12. Additionally and optionally, the actuator 6 and the secondary actuator 16 may be comprised as operatively coupled actuators or as a single actuator that actuates and cause both optical fibers 4, 10 to move in relation to the other optical fiber, and within at least two degrees of freedom, or in two dimensions. The invented VOA 2 can form trajectories shaped as circles, ellipses, ovals, spirals, straight lines, and other suitable nonlinear trajectories known in the art.

The actuator 6 and the secondary actuator 16 of the invented VOA 2 may be or comprise, in various alternate preferred embodiments of the present invention, an actuator selected from the group consisting of an electro-mechanical actuator, an electro-static actuator, a piezo-electric actuator, a thermo-mechanical actuator, an electromagnetic actuator, and a polymer actuator. Where the actuator 6 or the secondary actuator 16 comprises a polymer actuator, the actuator 6 or the secondary actuator 16 may be or comprise an actuator selected from the group consisting of an electro-active polymer actuator, an optical-active polymer, a chemically active polymer actuator, a magneto-active polymer actuator, an acousto-active polymer actuator and a thermally active polymer actuator.

Either or both of the optional collimators 15 of the invented VOA 2 may be or comprise, in various alternate preferred embodiments of the present invention, a lens selected from the group consisting of an optical lens, an optical lens, a spherical lens, an aspherical lens, a ball lens, a GRIN lens, a C-lens, and a lens system, or another suitable lens known in the art. In various alternate preferred embodiments of the preset invention the actuator 6 and/or the optional collimator(s) 15 of the invented VOA 2 may be integrated on a substrate or comprised within a MEMS-based device.

Figure 2A:
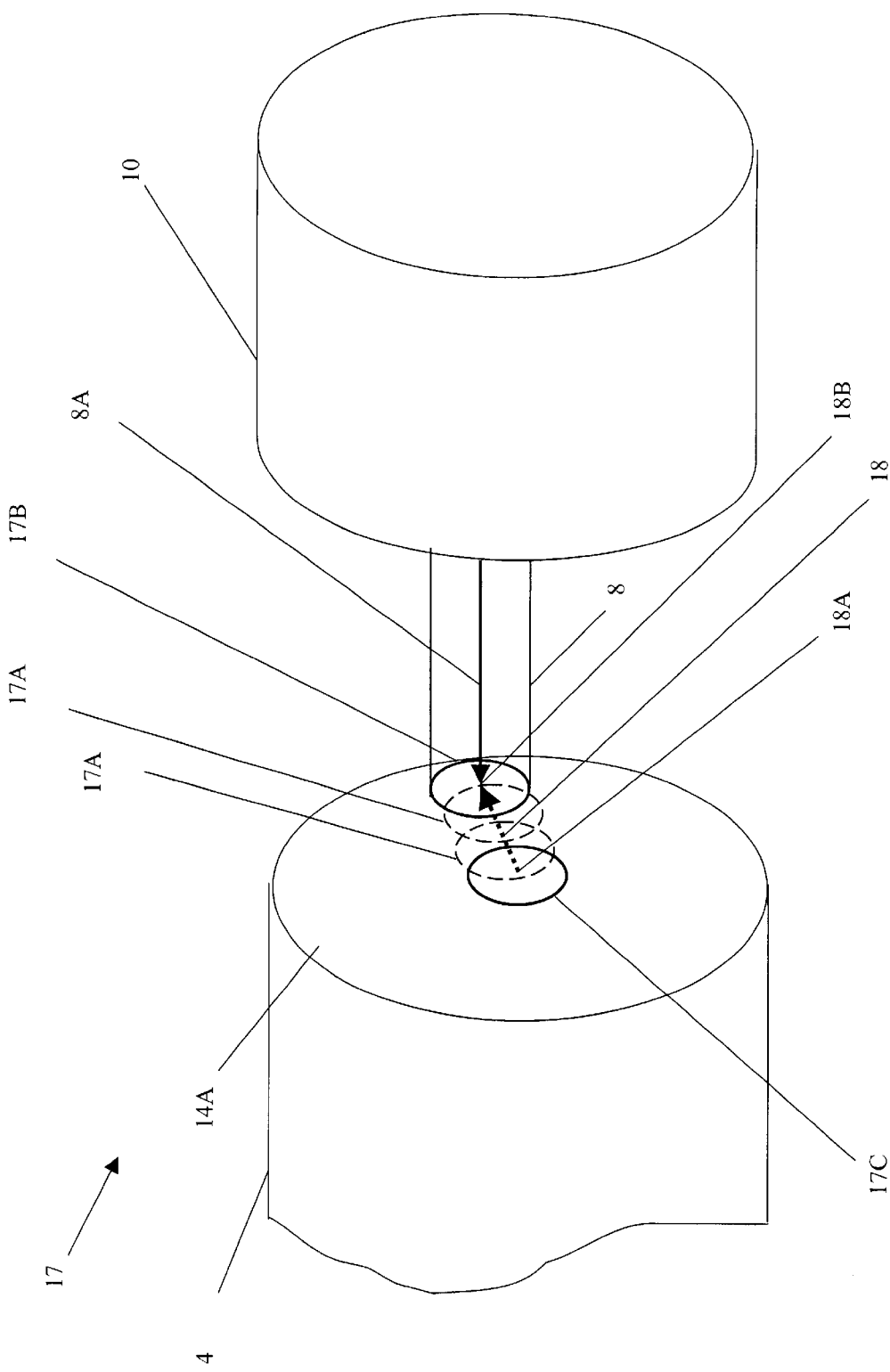
FIG. 2A is an illustration of prior art implementation of two optical fibers in close proximity and having a prior art linear trajectory.

Referring now generally to the Figures and particularly to FIGS. 1 and 2A, the invented VOA 2 of FIG. 1 is shown in a VOA configuration 17 wherein the optional collimators 15 are not included. The light beam 8 has an optical axis 8A that is aimed by the VOA configuration 17 within a linear-radial prior art trajectory 18. The prior art linear trajectory 18 is shown by way of comparison with the method of the present invention. A plurality of light beam spots 17A, or strike circles 17A, are each particular positions of the light beam 8 that occur as the light beam 8 strikes the receiving face 14 while the light beam optical axis 8A moves within the prior art trajectory 18 while striking the receiving face 14. The immediate strike circle 17B is caused by the present striking of the light beam 8 onto the receiving face 14. The light beam 8 additionally strikes the core 17C of the optical fiber 4 to achieve minimum attenuation. The prior art trajectory 18 includes a wave guide center point 18A and a wave guide peripheral point 18B as end points of the linear trajectory 18. The optical axis 8A is striking the wave guide peripheral point 18B. The wave guide center point 18A is located at the axial center of the wave guide 4.

Figure 2B:
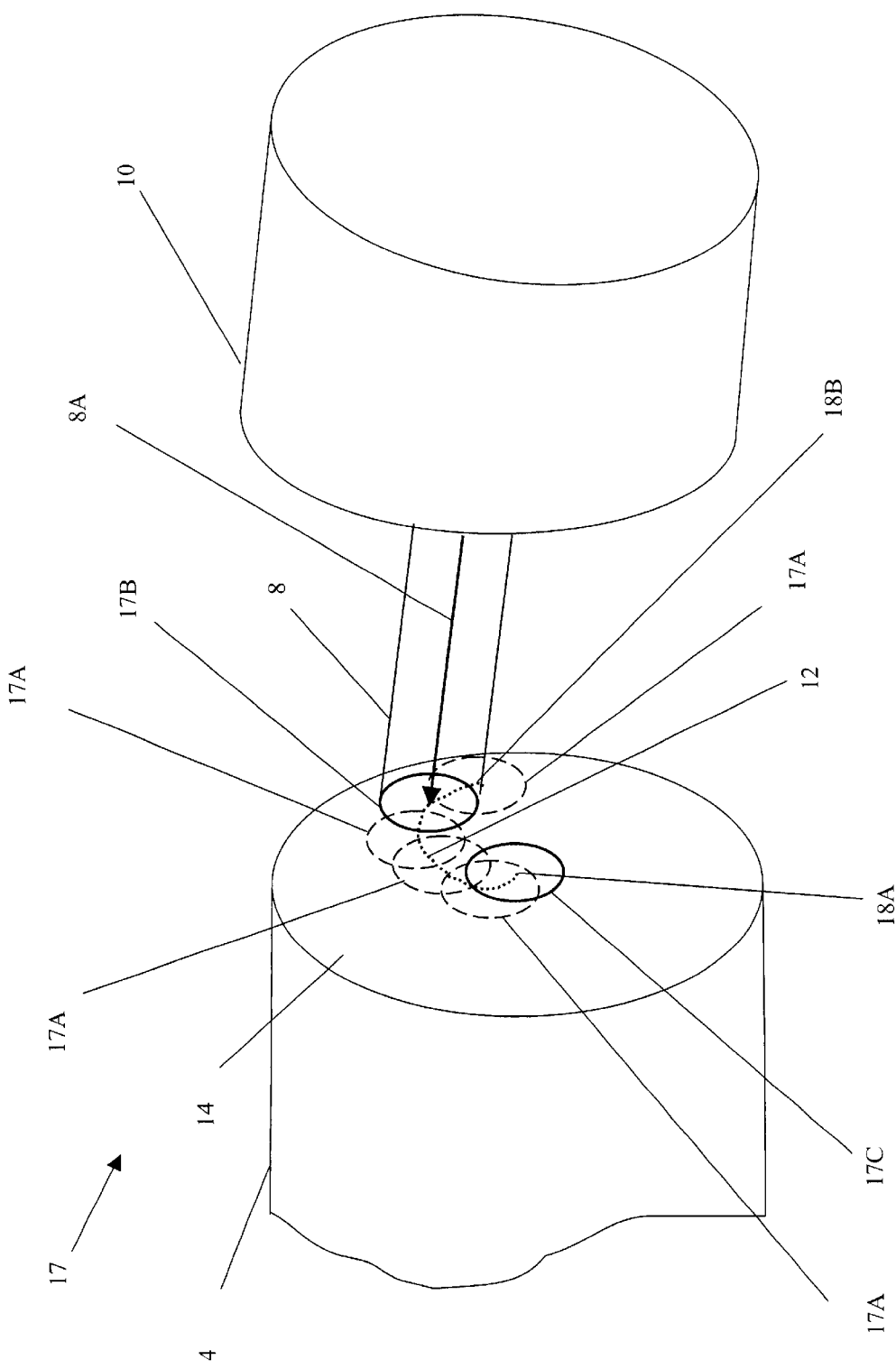
FIG. 2B is an illustration of the first preferred embodiment of FIG. 1 in close proximity and without the optional collimators and having a circular, two dimensional trajectory.

Referring now generally to the Figures and particularly to FIGS. 1 and 2B, the circular trajectory 12 includes the wave guide center point 18A and the periphery point 18B. The light beam optical axis 8A remains within the circular trajectory 12 as the light beam is moved within at least two dimensions to form the circular trajectory 12. A plurality of strike circles 17A are each particular positions of the light beam 8 that occur as the light beam 8 strikes the receiving face 14 while the light beam optical axis 8A moves within the circular trajectory 12 and while striking the receiving face 14. The immediate strike circle 17B is caused by the present striking of the light beam 8 onto the receiving face 14. The optical axis 8A is shown to be striking the receiving face 14 at a point 12A of the circular trajectory 12.

Figure 3:
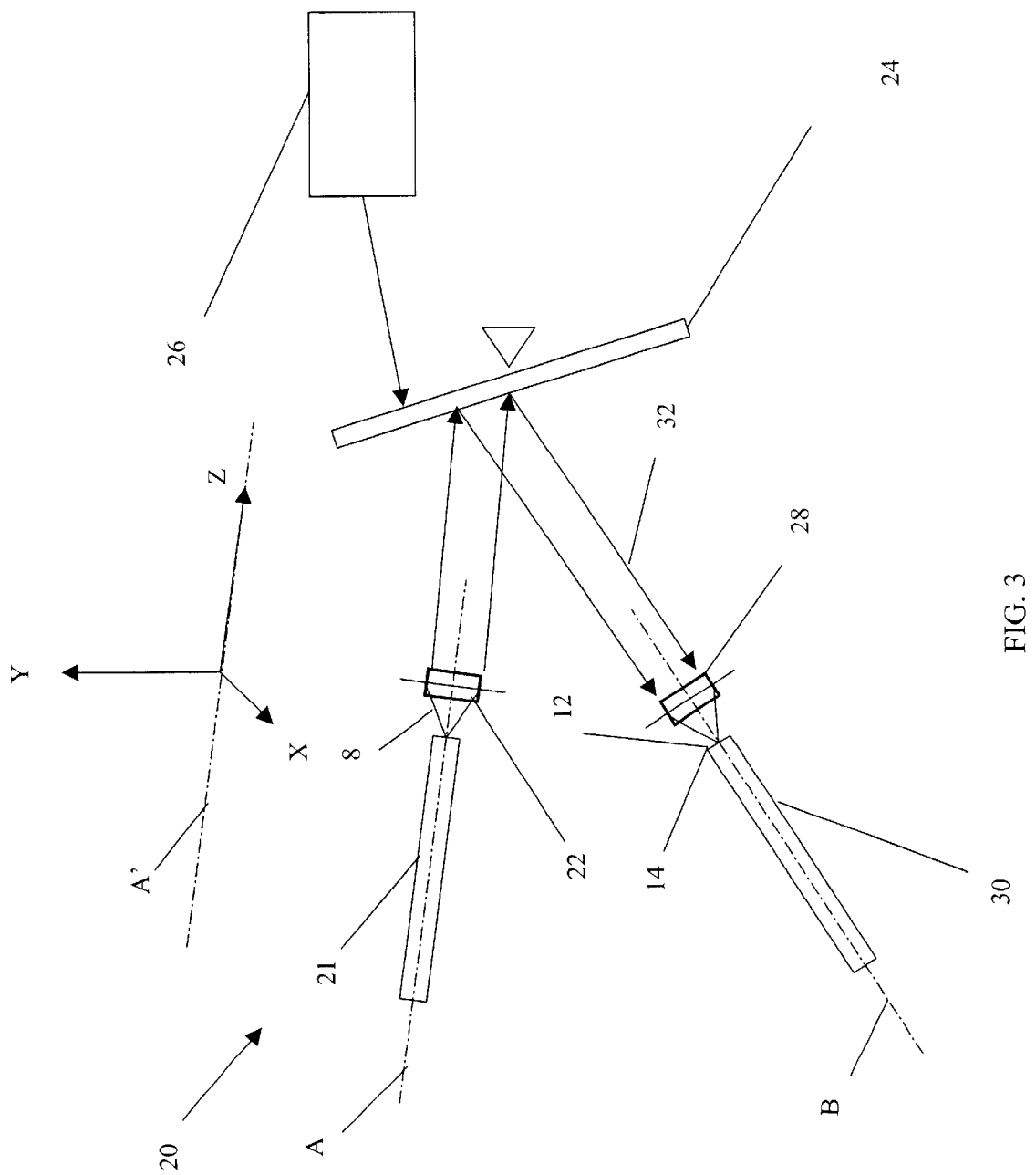
FIG. 3 is an illustration of an alternate second preferred embodiment of the present invention that generates the prior art linear-radial trajectory, a circular trajectory and a spiral trajectory, as well as an ellipse trajectory and an oval trajectory and other suitable two dimensional trajectories, by actuating a mirror that reflects the light beam from one optical fiber to another optical fiber.

Referring now generally to the Figures and particularly to FIG. 3, an alternate preferred embodiment of the present invention, or mirror VOA 20, includes an input optical fiber 21 having an input optical axis A, an optional input collimator 22, a mirror 24, a mirror actuator 26, an optional output focusing element 28 and an output optical fiber 30 having an output optical axis B. The light beam 8 exits the input optical fiber 21 along the input optical axis A, is then collimated by the input collimator 22 and strikes the mirror 24. The position of the mirror 24 determines a direction of travel of a reflected light beam 32 that is formed by the reflection of the light beam 8 from the mirror 24. The reflected light beam 32 generally travels towards the optional output focusing element 28. The mirror actuator 26 is operatively coupled to the mirror 24 and moves the mirror 24 within two degrees of rotational freedom of motion. The mirror 24 is rotatable by the mirror actuator 26 about both the X axis and the Y axis. The X axis and the Y axis are mutually orthogonal to each other and to the Z vector, where the Z vector is the direction of travel of the light beam 8 after the light beam 8 has exited the input optical fiber 21, i.e. parallel to optical axis A. The reflected light beam 32 is focused by the optional output focusing element 28 and travels via the optional output focusing element 28 into the receiving face 14 of the output optical fiber 30. The actuation of the mirror 24 by the mirror actuator 26 within two degrees of rotational freedom of motion enables the formation of a two dimensional trajectory 12 on the receiving face 14 of the output optical fiber. The mirror VOA 20 can form trajectories shaped as circles, ellipses, ovals, spirals and straight lines.

The mirror actuator 26 of the mirror VOA 20 may be or comprise, in various alternate preferred embodiments of the present invention, an actuator selected from the group consisting of an electro-mechanical actuator, an electro-static actuator, a piezo-electric actuator, a thermo-mechanical actuator, an electromagnetic actuator, and a polymer actuator. Where the mirror actuator 26 comprises a polymer actuator, the mirror actuator 26 may be or comprise an actuator selected from the group consisting of an electro-active polymer actuator, an optical-active polymer, a chemically active polymer actuator, a magneto-active polymer actuator, an acousto-active polymer actuator and a thermally active polymer actuator.

Either or both the optional input collimator 22 and the output focusing element 28 of the mirror VOA 20 may be or comprise, in various alternate preferred embodiments of the present invention, a lens selected from the group consisting of an optical lens, a spherical lens, an aspherical lens, a ball lens, a GRIN lens, a C-lens, a lens system, or another suitable lens known in the art. In various alternate preferred embodiments of the preset invention the mirror 24 and the mirror actuator 26, and/or the optional input collimator 22 an optional output focusing element 28, of the mirror VOA 20 may be integrated on a substrate or comprised within a MEMS-based device. The substrate used with an integrated mirror VOA 20 or a MEMS mirror VOA 20 may be a semiconductor material, such as silicon, or gallium arsenide, or another suitable substrate material known in the art. The substrate comprised within an integrated invented VOA 2 or a MEMS invented VOA 2 may be a single, or two, or a plurality of substrates in combination. The substrate comprises a semiconductor material, such as silicon, or gallium arsenide, or another suitable substrate material known in the art.

Figure 4:
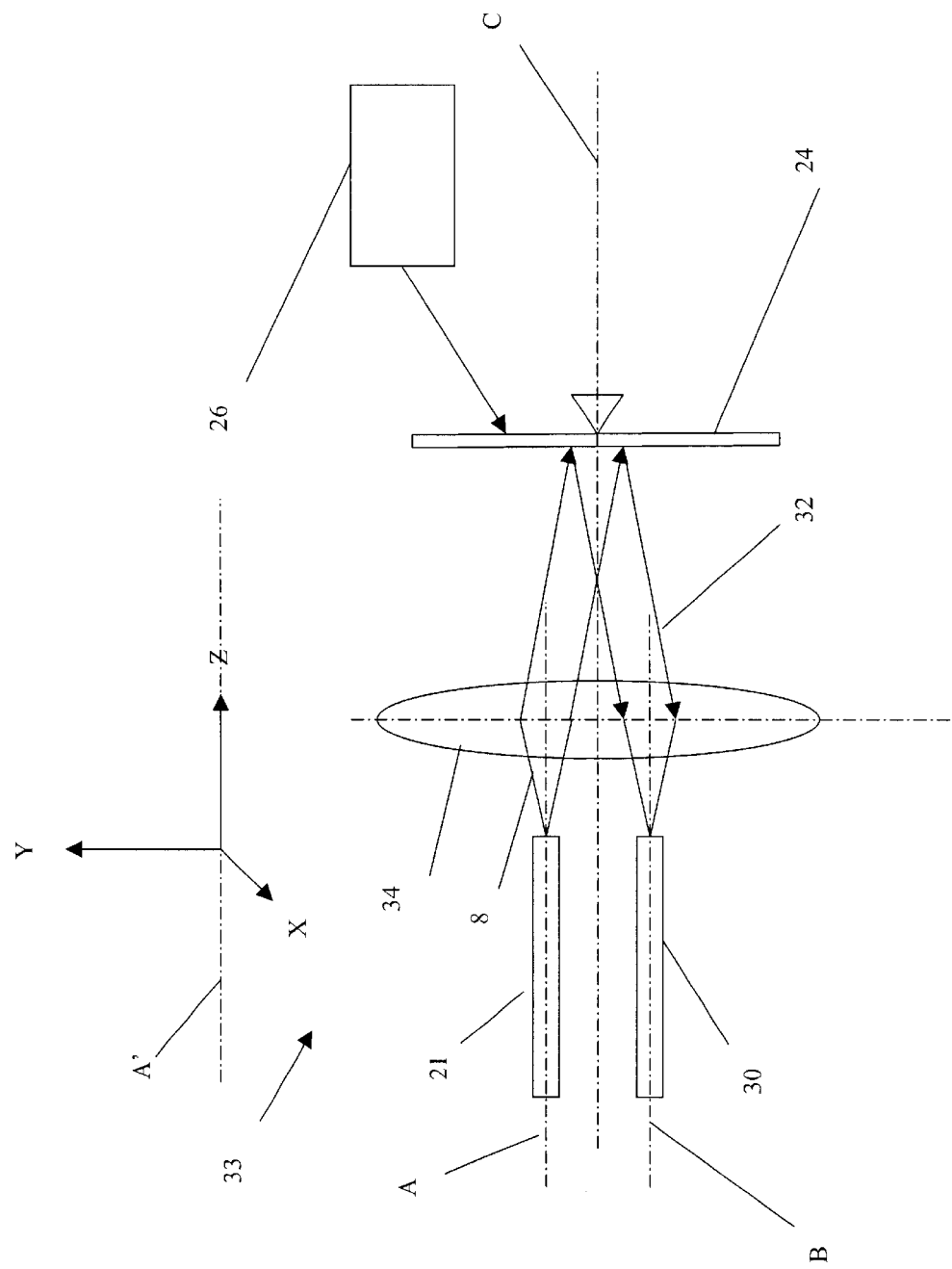
FIG. 4 is an illustration of a still alternate third preferred embodiment of the present invention having a mirror, two optical fibers and a lens.

Referring now generally to the Figures and particularly to FIG. 4, a second mirror configuration VOA 33 includes an input optical fiber 21 having an input optical axis A, a lens 34, a mirror 24, a mirror actuator 26, and an output optical fiber 30 having an output optical axis B. The light beam 8 exits the input optical fiber 21 along the input optical axis A, is then collimated by the lens 34 and strikes the mirror 24. The position of the mirror 24 determines a direction of travel of the reflected light beam 32 that is formed by the reflection of the light beam 8 from the mirror 24. The reflected light beam 32 generally travels towards the lens 34. The mirror actuator 26 is operatively coupled to the mirror 24 and moves the mirror 24 within two degrees of rotational freedom of motion. The mirror 24 is rotatable by the mirror actuator 26 about both the X axis and the Y axis. The X axis and the Y axis are mutually orthogonal to each other and to the Z vector, where the Z vector is the direction of travel of the light beam 8 after the light beam 8 has exited the input optical fiber 21, i.e. parallel to optical axis A. Axis A' is parallel to axis A and vector Z and is presented to highlight the parallelism of axis A and vector Z. The reflected light beam 32 is focused by lens 34 and travels into the receiving face 14 of the output optical fiber 30. The actuation of the mirror 24 by the mirror actuator 26 within two degrees of rotational freedom of motion enables the formation of a two dimensional trajectory 12 on the receiving face 14 of the output optical fiber.

Figure 5:
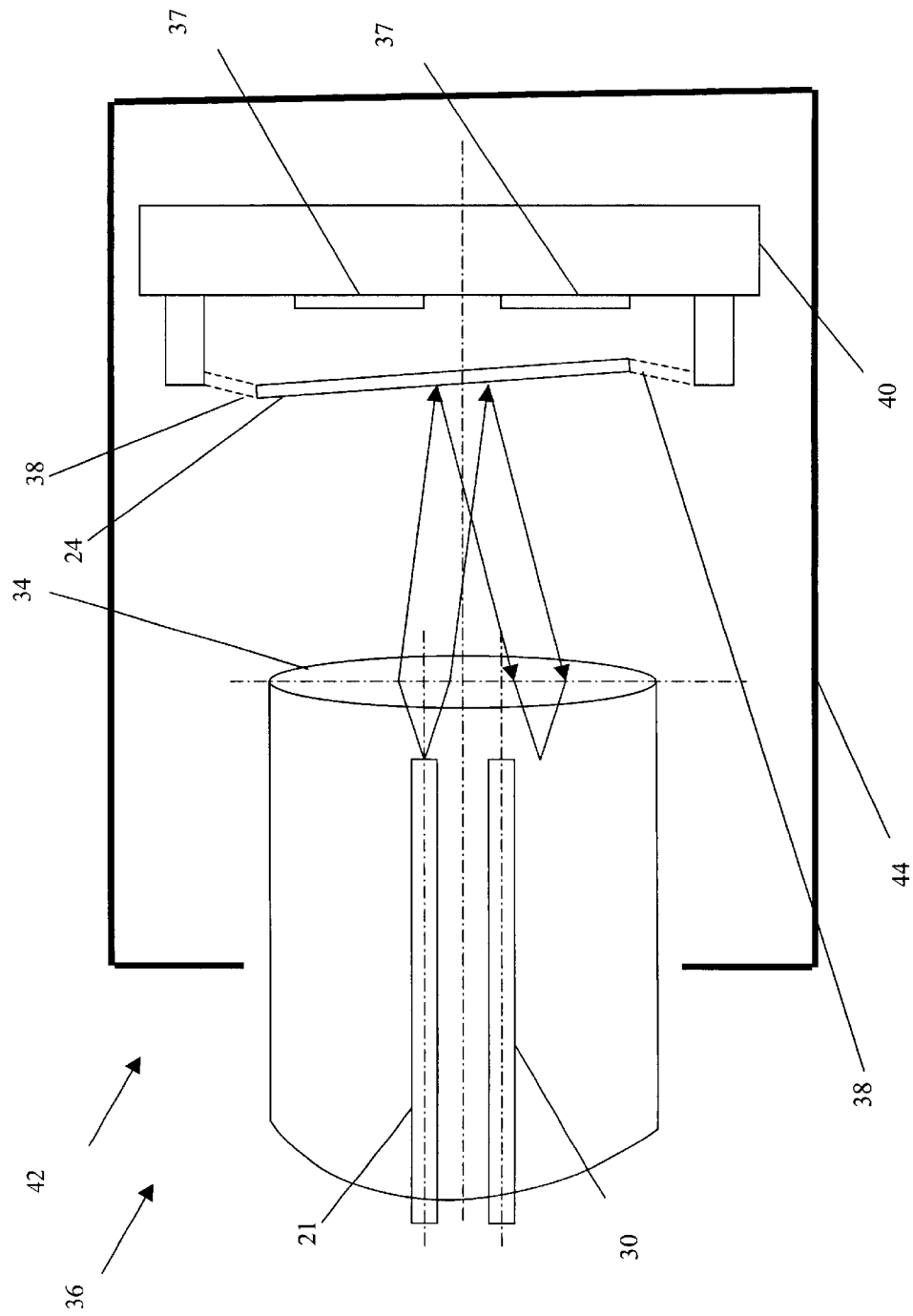
FIG. 5 is a schematic of a MEMS mirror VOA designed and implemented according to the method of the present invention.

Referring now generally to the Figures and particularly to FIG. 5, a MEMS mirror VOA 36 is a MEMS-based device designed and implemented according to the method of the present invention. The MEMS mirror VOA 36 includes an input optical fiber 21, the lens 34, the mirror 24, an electrostatic mirror actuator 37, and the output optical fiber 30.

The mirror 24, the electrostatic mirror actuator 37 and the suspension system 38 are coupled with each other and a substrate 40. The electrostatic mirror actuator 37 actuates the mirror 24 in at least two dimensions and the suspension system 38 provides a restoring force to return the mirror to an initial position when the mirror is actuated out of the initial position.

The substrate 40 may be a single, or two, or a plurality of substrates in combination. The substrate 40 comprises a semiconductor material, such as silicon, or gallium arsenide, or another suitable substrate material known in the art. The MEMS mirror VOA 36 is comprised as a MEMS-based device 42 within a package 44.

Referring now generally to the Figures and particularly to FIGS. 2A, 2B, 6A and 6B, the method of the present invention linearizes the optical-loss-versus-actuation curve for the invented VOA 2, in which attenuation of an optical signal is based on a misalignment of the light beam 8, as one example, as transmitted from the second optical fiber 10, or input fiber 10, to the receiving face 14 of the first optical fiber 4, or output fiber 4. FIG. 6A shows the prior art VOA linear trajectory 18 and FIG. 6B graphs the corresponding optical loss versus light beam optical axis 8A position along the prior art linear trajectory 18.

Prior art VOA's based on this misalignment method generate variable optical losses by moving the optical axis 8A (containing the peak power density points) of the light beam 8, as the light beam 8 strikes the receiving face 14, away from the center 18A, of the output fiber 4 in a linear fashion, i.e. along a straight line. The disadvantage of prior art is that the optical loss versus position of the light beam 8 is a highly non-linear (approximately quadratic) relationship due to the wave guide properties of single mode fibers. This means that at higher attenuation settings, the actual attenuation is highly sensitive to the light beam 8 position on face 14 which puts severe constraints on the control of the light beam 8 position.

The method of the present invention comprises the steps of moving the light beam 8 within a two-dimensional trajectory on the face 14 of the input fiber instead of along a straight line trajectory 18. The two-dimensional trajectory can be designed such that the overall loss-versus-trajectory-position is linearized significantly compared to the quadratic relation when moving along a straight line, whereby the method of the present invention reduces the sensitivity of optical attenuation to light beam 8 position uncertainty.

The function of the invented VOA 2 is, in one implementation, to transmit light beams 8 of an optical signal from the input fiber 10 to the output fiber 4 with controllable and variable attenuation of the optical power of the transmitted signal. Optical attenuation is achieved with the invented VOA 2 by mis-aiming the optical axis 8A of the light beam 8 away from the center 18A of the output fiber 4. In the example described, the amount of mis-aiming is determined by the at least two dimensional movement of the output fiber 4 by the actuator 6 and optionally by movement of the input fiber 10 by the optional actuator 16. In mirror VOA 20 of FIG. 3, the mirror actuator 26 causes the desired misalignment of the reflected light beam 32 by moving the mirror 24 in at least two dimensions. As a result of controlled mis-positioned of the light beam spot 17A, 17B & 17C, the optical losses, when expressed in decibels, are in good approximation proportional to the square of the distance of the striking of the light beam optical axis 8A on the face 14 of the output fiber 4 from the center 18A of the core 17C of the output fiber 4.

The variable mis-positioning of the optical axis 8A of the light beam 8, 32 in prior art VOA's follows a straight trajectory 18 on the receiving face 14 of the output fiber 4 as shown in FIG. 6A. Because the prior art trajectory 18 is straight, the distance from the center of the light beam 8 to the center 18A of the fiber core 17C equals the position on the trajectory. Therefore, the corresponding loss-versus-trajectory-position is quadratic, as shown in FIG. 6B, where the relationship between the attenuation of the light beam 8, as expressed in decibels, versus the trajectory position, i.e. ΔX, as expressed in microns is shown as curve 18'.

The prior art straight-line trajectory 18 will therefore exhibit a highly non-uniform sensitivity of the attenuation to position inaccuracy on the trajectory with the largest sensitivity at the high end of the attenuation range.

The highly non-linear attenuation vs. trajectory position of FIG. 6A can be linearized by implementing two dimensional, or 2D, mis-positioning of the light beam 8 on the face 14 of the output fiber 4 rather than the prior art one dimensional, or 1D, mis-positioning. A 2D trajectory can be realized, in various suitable configurations and in accordance with the method of the present invention, by the use of 2D beam directing actuators 6, 16, 26, 37 and mirrors 24.

Referring now generally to the Figures and particularly to FIGS. 7A, 7B, 8, 9A and 9B, two alternate embodiments of the method of the present invention include linearizing 2D trajectories in a half-circle trajectory 12, and alternately, in an optimized spiral shape trajectory 46. Implementing a half-circle trajectory 12 starting in the center 18A of the fiber core 17C and ending at the peripheral point 18B of desired maximum attenuation, equal to the end-point of the straight line trajectory 18 shown in FIGS. 2A and 6A, the same attenuation range can be covered with an improved linearity profile, as is illustrated in FIGS. 7A and 7B. FIG. 7A illustrates a 2D, half-circle trajectory 12 of the optical axis 8A on the receiving face 14 of the output fiber 4. FIG. 7B presents a corresponding optical loss versus image position along the half-circle trajectory 12, where the relationship formed by the trajectory 12 between the attenuation of the light beam 8, as expressed in decibels, versus the trajectory position, i.e. ΔX, as expressed in microns is shown as curve 12'. The dotted line 18' of FIG. 7B is the relationship of attenuation versus trajectory position of the straight line trajectory 18, as per FIG. 6B.

Figure 8:
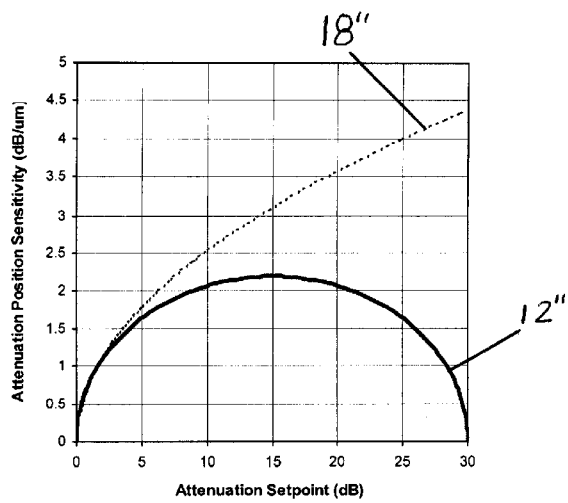
FIG. 8 charts the attenuation position sensitivity versus attenuation setpoint of the prior art trajectory of FIG. 2A and the circular trajectory of FIG. 2B.

By calculating the change in attenuation per micron travel along the trajectories 12 and 18, i.e. the derivative of the attenuation curves, we can compare the positional sensitivity and the linearity of the attenuation for the straight line trajectory 18 and the half-circle trajectory 12, as is shown in FIG. 8. FIG. 8 graphs the sensitivity to positional uncertainty along half-circular trajectory 12, and compares sensitivities of the straight line trajectory 18, as per the dotted line 18", and of the half-circle trajectory 12, as shown by the solid line 12".

Referring to the comparison shown in FIG. 8, it is clear that the half-circle trajectory 12 shows much reduced positional sensitivity for higher attenuation settings. There is a benefit in performance for the half-circle case as the maximum adjusted positional sensitivity is reduced by 50% for a 30 dB attenuation range.

Figure 9A:
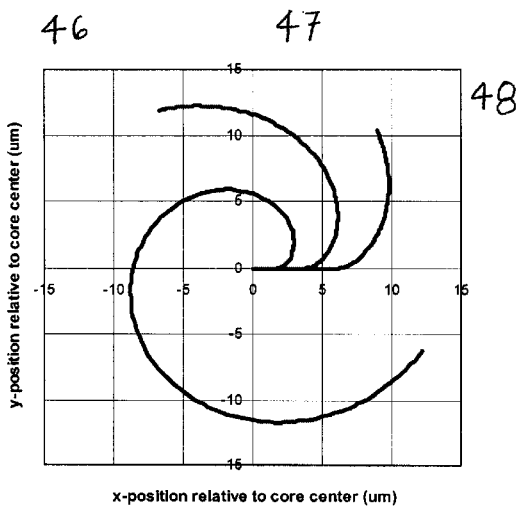
FIG. 9A illustrates three curved, spiraled trajectories.
Figure 9B:
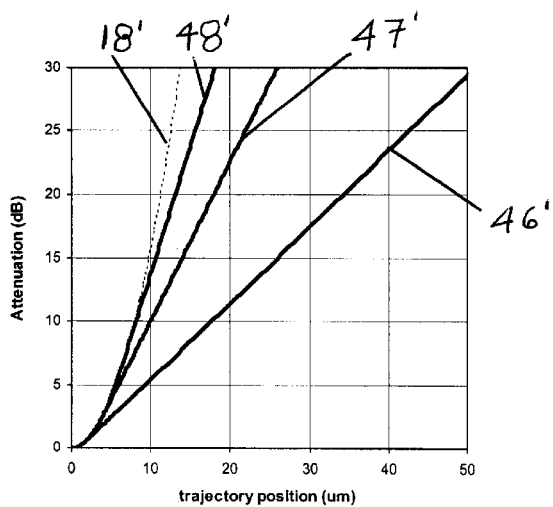
FIG. 9B graphs the optical loss versus the light beam spot position of the prior art linear trajectory of FIG. 2A and the three trajectories of FIG. 9B.

Referring now generally to the Figures, and particularly to FIGS. 9A and 9B, the half-circle trajectory 12 is presented herein as an illustrative example rather than as an optimized application. The trajectory 46 of FIG. 9A is theoretically calculated to be the most optimal trajectory for minimum sensitivity of the attenuation along the trajectory. FIG. 9A displays samples of calculated curved or spiral trajectories 46, 47, 48, where the spiral trajectories 46, 47 and 48 are formed on the receiving face 14 of the output fiber 4. The spiral trajectories 46, 47 and 48 are formed to investigate for a trajectory having an optimized linearity of attenuation versus trajectory position. FIG. 9B presents corresponding attenuation versus trajectory position graphs of 46', 47' and 48' as respectively caused by the spiral trajectories 46, 47, and 48. The results of the optimization show that there is a continuum of these spiral shaped trajectories 46, 47, and 48 that satisfy a linear attenuation versus trajectory position requirement for a large portion of the required attenuation range. As the given examples of spiral trajectories 46, 47 and 48 illustrate, there is a solution for any amount of total circulating angle, even beyond 360° to multiple circulations.

Figure 10:
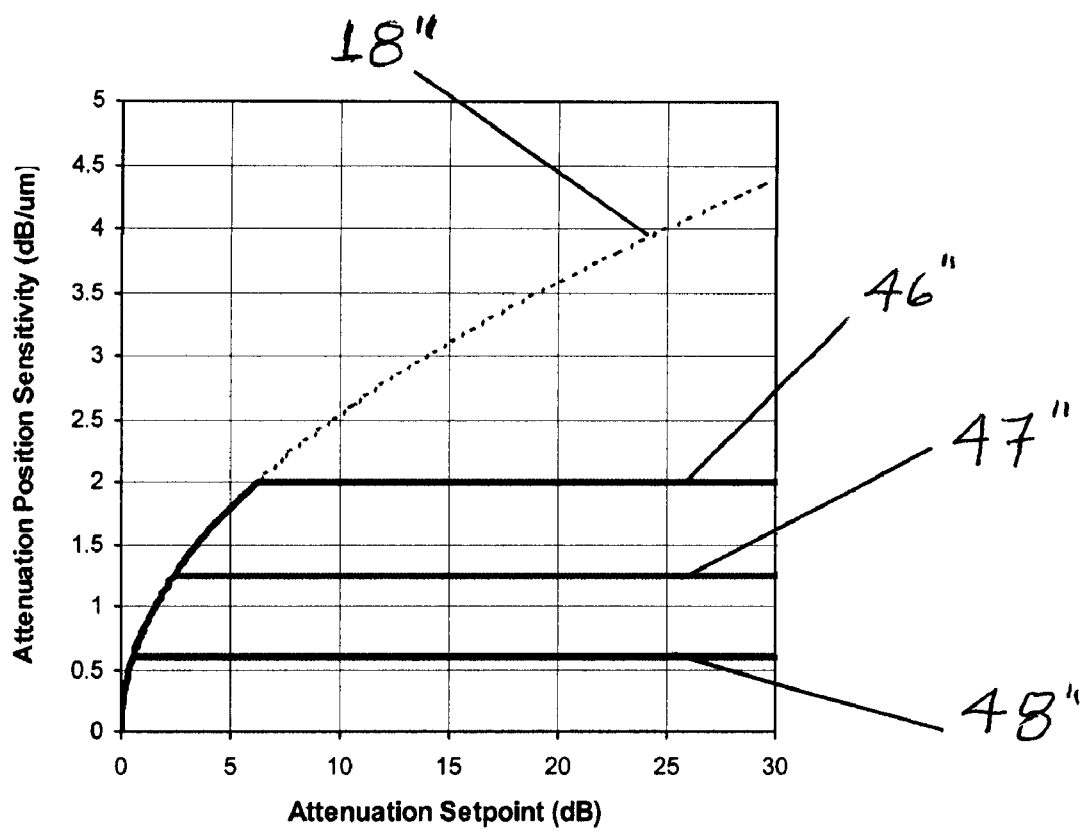
FIG. 10 charts the attenuation position sensitivity versus attenuation setpoint of the prior art trajectory of FIG. 2A and the trajectories of FIG. 9A.

Making a similar comparison of the position sensitivity as we did between the half-circular trajectory 12 and straight line trajectory 18 as described above, FIG. 10 shows the results for the linearity optimized trajectories 46, 47 and 48 of FIG. 9A as curves 46", 47" and 48". FIG. 10 graphs the attenuation sensitivity to positional uncertainty along trajectory 46, 47, 48 paths, and comparison between straight line trajectory 18, as per dotted line 18", and spiral trajectories 46, 47 & 48, as shown with corresponding solid lines 46", 47" and 48". FIG. 10 shows that as soon as the trajectory position moves into the linearized portion, i.e. the spiraled portion, there is a substantial benefit to the achievable attenuation accuracy.

The invention has been described in conjunction with the preferred embodiments. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

We claim:

1. A VOA for attenuating an optical signal between two photonic components, the optical signal transmitted via a light beam, by changing an alignment of the light beam between two photonic components in at least two dimensions, the VOA comprising:

a. a first photonic component, the first photonic component for emitting the light beam b. a second photonic component, the second photonic component for receiving at least part of the light beam; and c. an actuator, the actuator operatively coupled with an actuated photonic component, where the actuated photonic component is selected form the group consisting of the first photonic component and the second photonic component, and wherein that actuator moves the actuated photonic component within at least two dimensions to cause the light beam to strike the second photonic component along a trajectory of at least two dimensions, wherein the trajectory has a shape selected from the group comprising a circle, an oval, an ellipse and a spiral.

2. The VOA of claim 1, wherein the first photonic component is selected from the group consisting of a wave guide, a planar wave guide, an optical fiber, a lens, a prism, a mirror and a collimator.

3. The VOA of claim 1, wherein the second photonic component is selected from the group consisting of a wave guide, a planar wave guide, an optical fiber, a lens, a prism, a mirror, and a collimator.

4. The VOA of claim 3, wherein the first photonic component is selected from the group consisting of a wave guide, a planar wave guide, an optical fiber, a lens, a prism, a mirror, and a collimator.

5. The VOA of claim 1, wherein the actuator is selected from the group consisting of an electro-mechanical actuator, an electro-static actuator, a piezo-electric actuator, a thermo-mechanical actuator, an electromagnetic actuator, and a polymer actuator.

6. The VOA of claim 5, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

7. The VOA of claim 1, wherein the VOA is integrated on a substrate.

8. The VOA of claim 1, wherein the VOA is incorporated as a MEMS-based device.

9. The VOA of claim 1, wherein the trajectory is substantially spiraled.

10. The VOA of claim 1, wherein the trajectory is substantially circular.

11. A VOA for attenuating an optical signal between an input photonic component and an output photonic component, the optical signal transmitted via a light beam, by changing an alignment of the light beam between the input and the output component in at least two dimensions, the VOA comprising:
  a. a mirror, the mirror for reflecting the light beam;
  b. an actuator, the actuator operatively coupled with the mirror and for moving the mirror within at least two degrees of freedom;
  c. the input photonic component, the input photonic component for emitting the light beam; and
  d. the output photonic component, the output photonic component for receiving at least part of the light beam after reflection from the mirror, wherein the actuator moves the mirror within at least two degrees of freedom to reflect at least part of the light beam to form a trajectory of at least two dimensions on the output photonic component, wherein the trajectory has shape selected from the group comprising a circle, an oval, an ellipse and a spiral.

12. The VOA of claim 11, further comprising an output focusing element, the output focusing element for receiving at least part of the reflected light beam from the mirror and for focusing the at least part of the reflected light beam at the output photonic component.

13. The VOA of claim 12, wherein the output focusing element comprises a lens selected from the group consisting of a spherical lens, an aspherical lens, a ball lens, a GRIN lens, a C-lens and a lens system.

14. The VOA of claim 11, wherein the VOA further comprises an input collimator, the input collimator positioned to collimate the light beam between the input photonic component and the mirror.

15. The VOA of claim 14, further comprising an output focusing element, the output focusing element for receiving at least part of the reflected light beam from the mirror and for focusing the at least part of the reflected light beam at the output photonic component.

16. The VOA of claim 15, wherein the output focusing element comprises a lens selected from the group consisting of a spherical lens, an aspherical lens, a ball lens, a GRIN lens, a C-lens and a lens system, and the input collimator comprises a lens selected from the group consisting of a spherical lens, an aspherical lens, a ball lens, a GRIN lens, a C-lens and a lens system.

17. The VOA of claim 14, wherein the input collimator comprises a lens selected from the group consisting of a spherical lens, an aspherical lens, a ball lens, a GRIN lens, a C-lens and a lens system.

18. The VOA of claim 11, wherein the input photonic component is selected from the group consisting of a wave guide, a planar wave guide, an optical fiber, a lens, a prism, a mirror, and a collimator.

19. The VOA of claim 11, wherein the output photonic component is selected from the group consisting of a wave guide, a planar wave guide, an optical fiber, a lens, a prism, a mirror, and a collimator.

20. The VOA of claim 19, wherein the input photonic component is selected from the group consisting of a wave guide, a planar wave guide, an optical fiber, a lens, a prism, a mirror, and a collimator.

21. The VOA of claim 11, wherein the actuator is selected from the group consisting of a electro-mechanical actuator, an electro-static actuator, a piezo-electric actuator, a thermo-mechanical actuator, an electromagnetic actuator, and a polymer actuator.

22. The VOA of claim 21, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

23. The VOA of claim 11, wherein the mirror and actuator are integrated on a substrate.

24. The VOA of claim 11, wherein the VOA is incorporated as a MEMS-based device.

25. The VOA of claim 11, wherein the mirror is a substantially flat mirror.

26. The VOA of claim 11, wherein the trajectory is substantially spiraled.

27. The VOA of claim 11, wherein the trajectory substantially circular.

28. A method for variable attenuation of an optical signal, the optical signal transmitted via a light beam, the method comprising:
  a. Providing an output optical fiber and an input optical fiber;
  b. Providing an actuator, the actuator operatively coupled with the output fiber and for moving the output fiber within at least two degrees of freedom;
  c. Transmitting the light beam through the input optical fiber and towards the output optical fiber; and
  d. Directing the actuator to move the output optical fiber within two degrees of freedom to enable the light beam to at least partially enter the output optical fiber at a desired level of attenuation of the optical signal, by causing the light beam to strike the output optical fiber along a trajectory, wherein the trajectory has a shape selected from the group comprising a circle, an oval, an ellipse and a spiral.

29. A method for variable attenuation of an optical signal, the optical signal transmitted via a light beam, the method comprising:
  a. Providing a input optical fiber and an output optical fiber;
  b. Providing a actuator, the actuator operatively coupled with the input fiber and for moving the input optical fiber within at least two degrees of freedom;
  c. Transmitting the light beam through the input optical fiber and towards the output optical fiber; and d. Directing the actuator to move the input optical fiber within two degrees of freedom to enable the light beam to at least partially enter the output optical fiber at a desired level of attenuation of the light beam, by causing the light beam to strike the output optical fiber along a trajectory, wherein the trajectory has a shape selected from the group comprising a circle, an oval, an ellipse and a spiral.

30. A method for variable attenuation of an optical signal, the optical signal comprising a light beam, the method comprising:
   a. Providing an input optical fiber and an output optical fiber, and a mirror;
   b. Positioning the input optical fiber, the output optical fiber and the mirror to enable the at least partial reflection of the light beam from the input optical fiber and into the output optical fiber;
   c. Providing an actuator, the actuator operatively coupled with the mirror and for moving the mirror within at least two degrees of freedom;
   d. Transmitting a light beam through the first optical fiber and towards the mirror; and
   e. Directing the actuator to move the mirror within at least two degrees of freedom to enable a reflection of the light beam to at least partially enter the output optical fiber at a desired level of attenuation, by causing the light beam to strike the output optical fiber along a trajectory, wherein the trajectory has a shape selected from the group comprising a circle, an oval, an ellipse and a spiral.

31. A method for variable attenuation of an optical signal, the optical signal transmitted via a light beam, the method comprising:
   a. providing an input photonic component, the input photonic component for emitting the light beam,
   b. providing an output photonic component, the output photonic component for receiving at least a part of the light beam,
   c. providing an actuator, the actuator operatively coupled with an actuated photonic component, and the actuator for moving the actuated photonic component within at least two degrees of freedom, wherein the actuated photonic component is selected from the group consisting of the input photonic component and the output photonic component;
   d. emitting the light beam from the input photonic component; and
   e. causing the actuator to move the actuated photonic component within at least two degrees of freedom and to cause the at least a part of the light beam to strike the output photonic component within a trajectory of at least two dimensions, whereby the optical signal is attenuated, wherein the trajectory has a shape selected from the group comprising a circle, an oval, an ellipse and a spiral.

32. The method of claim 31, wherein the trajectory is substantially spiraled.

33. The method of claim 31, wherein the trajectory is substantially circular.

34. The method of claim 31, wherein the input photonic component is an optical fiber.

35. The method of claim 31, wherein the output photonic component is an optical fiber.

36. The method of claim 35, wherein the trajectory has a shape selected from the group consisting of a circle, an oval, an ellipse and a spiral.

37. The method of claim 35, wherein the trajectory is substantially spiraled.

38. The method of claim 35, wherein the trajectory is substantially circular.

39. The method of claim 31, wherein the input photonic component is an input optical fiber and the output photonic component is an output optical fiber.

40. A method for variable attenuation of an optical signal, the optical signal transmitted via a light beam, the method comprising:
   a. providing an input optical fiber, the input optical fiber for emitting the light beam,
   b. providing an output optical fiber, the output optical fiber for receiving at least a part of reflected light beam,
   c. providing a movable mirror, the movable mirror for reflecting at least part of the light beam toward the output optical fiber and the mirror movable within at least two degrees of freedom;
   d. providing an input collimator, the input collimator for collimating the light beam in between the input optical fiber and the mirror;
   e. providing an output collimator, the output collimator for focusing the at least part of the reflected light beam toward the output optical fiber;
   f. providing an actuator, the actuator operatively coupled with the movable mirror, and the actuator for moving the movable mirror within at least two degrees of freedom;
   g. emitting the light beam from the input optical fiber, through the input collimator and to the movable mirror; and
   h. causing the actuator to move the movable mirror within at least two degrees of freedom and to cause the at least part of the reflected light beam to reflect off of the mirror, to pass through the output collimator and to strike the optical fiber within a trajectory of at least two dimensions, hereby the optical signal is attenuated, wherein the trajectory has shape selected from the group comprising a circle, an oval, an ellipse and a spiral.

41. The method of claim 40, wherein the input collimator and the output focusing element are comprised within a dual fiber collimator, and the input optical fiber and the output optical fiber are coupled with the dual fiber collimator.

42. The method of claim 40, wherein the trajectory is substantially spiraled.

43. The method of claim 40, wherein the trajectory is substantially circular.

44. A VOA for attenuating an optical signal between two photonic components, the optical signal transmitted via a light beam, by changing an alignment of the light beam between the two photonic components in at least two dimensions, the VOA comprising:
   a. a mirror, the mirror for reflecting the light beam;
   b. an actuator, the actuator operatively coupled with mirror and for moving the mirror within at least two degrees of freedom;
   c. an input optical fiber, the input optical fiber for emitting the light beam;
   d. an output optical fiber, the output optical fiber for receiving at least part of the light beam after reflection from the mirror; and
   e. a lens, the lens coupled with the input optical fiber and the output optical fiber, wherein the lens collimates the light between the input optical fiber an the mirror and the lens focuses the light beam between the mirror and the output optical fiber, and wherein the actuator move the mirror within at least two degrees of freedom to reflect at least part of the light beam to form a trajectory of at least two dimensions on the output optical fiber, wherein the trajectory has a shape selected from the group comprising a circle, an oval, an ellipse and a spiral.

45. The VOA of claim 44, wherein the lens is selected from the group consisting of a spherical lens, an aspherical lens, a ball lens, a GRIN lens, a C-lens and a lens system.

46. The VOA of claim 44, wherein the actuator is selected from the group consisting of a electro-mechanical actuator, an electro-static actuator, a piezo-electric actuator, a thermo-mechanical actuator, an electromagnetic actuator, and a polymer actuator.

47. The VOA of claim 46, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

48. The VOA of claim 44, wherein the mirror and actuator are integrated on a substrate.

49. The VOA of claim 44, wherein the VOA is incorporated as a MEMS-based device.

50. The VOA of claim 44, wherein the mirror is a substantially flat mirror.

51. The VOA of claim 44, wherein the trajectory is substantially spiraled.

52. The VOA of claim 44, wherein the trajectory is substantially circular.

53. A method for attenuating an optical signal, the optical signal transmitted via a light beam, by changing an alignment of the light beam with a photonic component in at least two dimensions, the method comprising:
   a. providing the photonic component;
   b. striking the photonic component with the light beam; and
   c. changing the alignment of the light beam in at least two dimensions, whereby an attenuation of the optical signal is varied as the alignment of the light beam with the photonic component is changed within the at least two dimensions by causing the light beam to strike the photonic component along a trajectory, wherein the trajectory has a shape selected from the group comprising of a circle, an oval, an ellipse and a spiral.

54. The method of claim 53, wherein the photonic component is selected from the group consisting of a wave guide, a planar wave guide, an optical fiber, a lens, a mirror, and a collimator.

55. The method of claim 53, further comprising:
   a. providing an input photonic component; and
   b. transmitting the light beam through the input photonic component before striking the photonic component with the light beam.

56. The method of claim 55, wherein the input photonic component is selected from the group consisting of a wave guide, a planar wave guide, an optical fiber, a lens, a prism, a mirror, and a collimator.

57. The method of claim 56, wherein the photonic component is selected from the group consisting of a wave guide, a planar wave guide, an optical fiber, a lens, a prism, a mirror, and a collimator.

58. The method of claim 55, further comprising:
   a. providing an actuator, the actuator operatively coupled with the input photonic component, and the actuator for moving the input photonic component in at least two dimensions; and
   b. directing the actuator to move the input photonic component in at least two dimensions, whereby an attenuation of the optical signal is varied as the input photonic component is moved in at least two dimensions.

59. The method of claim 58, wherein the actuator is selected from the group consisting of a electro-mechanical actuator, an electro-static actuator, a piezo-electric actuator, a thermo-mechanical actuator, an electromagnetic actuator, and a polymer actuator.

60. The method of claim 59, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

61. The method of claim 53, wherein the trajectory substantially spiraled.

62. The method of claim 53, wherein the trajectory is substantially circular.

63. A method for attenuating an optical signal, the optical signal transmitted via a light beam, by changing a position of a photonic component relative to the light beam of the optical signal within at least two dimensions, the method comprising:
   a. providing a photonic component;
   b. providing the light beam; and
   c. moving the photonic component relative to the light beam in at least two dimensions, whereby an attenuation of the optical signal is varied as the position of the photonic component relative to the light beam is moved in at least two dimensions to cause the light beam to strike the photonic component within a trajectory of at least two dimensions, wherein the trajectory has a shape selected from the group comprising of a circle, an oval, an ellipse and a spiral.

64. The method of claim 63, further comprising:
   a. providing an actuator, the actuator operatively coupled with the photonic component, and the actuator for moving the photonic component in at least two dimensions; and
   b. directing the actuator to move the photonic component in at least two dimensions, whereby an attenuation of the optical signal is varied as the position of the photonic component relative to the light beam is moved in at least two dimensions.

65. The method of claim 64, wherein the actuator is selected from the group consisting of a electro-mechanical actuator, an electro-static actuator, a piezo-electric actuator, a thermo-mechanical actuator, an electromagnetic actuator, and a polymer actuator.

66. The method of claim 65, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

67. The method of claim 63, wherein the trajectory is substantially spiraled.

68. The method of claim 63, wherein the trajectory substantially circular.

* * * * *